United States Patent
Jung

(10) Patent No.: US 8,831,393 B2
(45) Date of Patent: Sep. 9, 2014

(54) UNMANNED UNDERWATER VEHICLE AND DEVICE FOR CONNECTION OF AN OPTICAL WAVEGUIDE CABLE TO AN UNMANNED UNDERWATER VEHICLE

(75) Inventor: Torsten Jung, Achim (DE)

(73) Assignee: Atlas Elektronik GmbH, Bremen (DE)

( * ) Notice: Subject to any disclaimer, the term of this patent is extended or adjusted under 35 U.S.C. 154(b) by 437 days.

(21) Appl. No.: 12/948,363

(22) Filed: Nov. 17, 2010

(65) Prior Publication Data

US 2011/0114006 A1    May 19, 2011

(30) Foreign Application Priority Data

Nov. 18, 2009  (DE) .......................... 10 2009 053 742

(51) Int. Cl.
  *G02B 6/00*   (2006.01)
  *B63G 8/40*   (2006.01)
  *B63G 8/41*   (2006.01)
  *G02B 6/44*   (2006.01)
  *B63C 11/34*  (2006.01)

(52) U.S. Cl.
  CPC ............... *G02B 6/4471* (2013.01); *B63C 11/34* (2013.01); *G02B 6/4427* (2013.01)
  USPC .............................. 385/135; 114/322; 114/328

(58) Field of Classification Search
  None
  See application file for complete search history.

(56) References Cited

U.S. PATENT DOCUMENTS

| 4,010,619 | A |   | 3/1977  | Hightower et al. |         |
|-----------|---|---|---------|------------------|---------|
| 4,468,157 | A | * | 8/1984  | Horton ........................... | 405/224 |
| 4,682,848 | A | * | 7/1987  | Cairns et al. ..................... | 385/69  |
| 5,224,189 | A | * | 6/1993  | Maas et al. ....................... | 385/98  |
| 6,152,609 | A |   | 11/2000 | Dzyck et al.     |         |
| 6,279,501 | B1|   | 8/2001  | Taylor, Jr.      |         |
| 6,390,012 | B1| * | 5/2002  | Watt et al. ....................... | 114/322 |
| 7,621,229 | B2| * | 11/2009 | Bowen et al. .................. | 114/244 |
| 7,878,138 | B2|   | 2/2011  | Lambertus        |         |
| 2003/0021556 | A1 | * | 1/2003 | Toth et al. ...................... | 385/100 |
| 2004/0264912 | A1 | * | 12/2004 | Cooke et al. .................. | 385/147 |
| 2006/0067792 | A1 | * | 3/2006 | Joshi et al. ..................... | 405/171 |
| 2008/0087186 | A1 |   | 4/2008 | Blohm et al.     |         |

(Continued)

FOREIGN PATENT DOCUMENTS

DE         300526         9/1917
DE      3112000  A1     10/1982

(Continued)

OTHER PUBLICATIONS

Office Action dated May 22, 2012, issued against Japanese Patent Application No. 2010-257848 (English translation unavailable).

*Primary Examiner* — Hemang Sanghavi
(74) *Attorney, Agent, or Firm* — Fitch, Even, Tabin & Flannery, LLP

(57) ABSTRACT

Unmanned underwater vehicles (1) which can be controlled from a carrier platform (2) by an optical waveguide cable (3) can be used for widely differing missions. For mine countermeasures, the loss of the underwater vehicle (1) is often accepted, with the optical waveguide cable (3) also being destroyed by the explosion. To reduce the costs of a mission of the underwater vehicle, the invention provides for the optical waveguide cable (3) to be connected to the underwater vehicle (1) via a connecting device (4). The connecting device (4) comprises a connecting cable (8) and connecting elements (11, 12) at the ends (9, 10) of the connecting cable (8) for an optical waveguide cable (3) at one end and for an unmanned underwater vehicle (1) at the other end.

11 Claims, 2 Drawing Sheets

(56) References Cited

U.S. PATENT DOCUMENTS

| | | |
|---|---|---|
| 2009/0087152 A1 | 4/2009 | Wich et al. |
| 2009/0151617 A1 | 6/2009 | Lambertus |
| 2010/0080524 A1* | 4/2010 | Ciechomski et al. ......... 385/135 |
| 2010/0212574 A1* | 8/2010 | Hawkes et al. ............... 114/328 |
| 2011/0168075 A1* | 7/2011 | Yemm et al. .................. 114/249 |
| 2012/0067267 A1* | 3/2012 | Ribesen et al. ............... 114/293 |

FOREIGN PATENT DOCUMENTS

| | | | |
|---|---|---|---|
| DE | 301215 | | 10/1992 |
| DE | 102004062126 A1 | | 7/2006 |
| EP | 0939327 A2 | | 9/1999 |
| FR | 2325557 A2 | | 5/1974 |
| FR | 2668446 A1 | | 4/1992 |
| GB | 2462641 A | * | 2/2010 |
| JP | 52-133699 A | | 11/1977 |
| JP | 56-085705 A | | 7/1981 |
| JP | 9-086493 A | | 3/1997 |
| JP | 2000-177689 A | | 6/2000 |
| JP | 2009-518216 A | | 5/2009 |
| WO | 0121476 A1 | | 3/2001 |
| WO | 0206146 A1 | | 1/2002 |
| WO | 2006074953 A2 | | 7/2006 |
| WO | 2008130682 A1 | | 10/2008 |

* cited by examiner

UNMANNED UNDERWATER VEHICLE AND DEVICE FOR CONNECTION OF AN OPTICAL WAVEGUIDE CABLE TO AN UNMANNED UNDERWATER VEHICLE

CROSS-REFERENCE TO RELATED APPLICATION

The present application claims the priority of German Patent Application No. 10 2009 053 742.2, filed Nov. 18, 2009, the subject matter of which, in its entirety, is incorporated herein by reference.

BACKGROUND OF THE INVENTION

The invention relates to a device for connection of an optical waveguide cable to an unmanned underwater vehicle, and to an unmanned underwater vehicle which can be controlled by means of an optical waveguide cable that can be fed from a carrier platform.

Unmanned underwater vehicles (UUV) are used for a multiplicity of tasks under water, so-called missions, for example in the civilian field for searching for and examining the seabed, for monitoring cables and pipelines on the seabed, and for the recovery of appliances which have been lost. In the military field, unmanned underwater vehicles are used in particular for searching for and destroying mines, or else for those operations which represent a high risk for manned missions.

As a remotely controlled underwater vehicle or so-called remotely operated vehicle (ROV), the underwater vehicle is remotely controlled by means of a connecting cable, which follows the underwater vehicle from a carrier platform, for example a surface vessel. The remote control cable is in this case normally a high-performance optical waveguide cable. Two variants of underwater vehicles which are remotely controlled via optical waveguide cables are used in the field of mine hunting. A first variant is used for more detailed identification of an object, for example a mine, which has been found, for example by sonar, and is then retrieved to the carrier platform. A second variant is used for mine clearance, which is additionally fitted with an explosive charge and, after the previously identified target has been found, it is itself destroyed at the same time when the target is destroyed. In the case of mine hunting drones such as these, that is to say unmanned underwater vehicles which are used to attack mines, it is accepted that the underwater vehicle will be lost to achieve the desired clearance success.

However, in the case of mine hunting drones such as these, a mine clearance failure also leads to loss of the underwater vehicle, since, for safety reasons, it can no longer be taken onboard, and the explosive charge carried in it is fired. In addition, the abovementioned first variant of underwater vehicles may be lost during mine hunting missions, specifically if the underwater vehicle activates the trigger mechanism of an underwater mine that has been found.

According to the prior art, optical waveguide swimming cables are used to control underwater vehicles, which cables have the tensile strength required to retrieve the underwater vehicle. In this case, it is desirable for the swimming cable to be light in weight, in order to prevent the cable from sinking.

The costs of a mine clearance mission are generally high, not least because the optical waveguide cable is destroyed at the same time as the loss of the underwater vehicle, and must be replaced. In this case, it may be necessary to remove a large proportion of the cable from the winch and to set up and wind on a new optical waveguide cable, which involves a large amount of labor effort, in addition to the procurement costs for the cable.

US 2008/0087186 A1 discloses a method for destruction of a mine that has been located, in which case an unmanned underwater vehicle cooperates as the primary vehicle with an unmanned, remotely controlled underwater vehicle as the secondary vehicle in order to detonate the mine, with the secondary vehicle being equipped with an explosive charge. In order to reduce the clearance costs in comparison to a method which uses a disposable vehicle, primary and secondary vehicles are used as an autonomously operating tandem, in which the secondary vehicle is remotely controlled from the primary vehicle. The secondary vehicle is designed as a disposable vehicle and is equipped with an explosive charge for mine destruction, and with an associated fuze. The drive energy is supplied to the secondary vehicle from an energy source in the primary vehicle via a connecting cable, which is also used to transmit guidance signals to a guidance apparatus in the secondary vehicle, and to transmit a trigger signal which activates the fuze. The tandem moves as an autonomous tandem, that is to say independently of a platform, on its own to a previously located mine. There, the primary vehicle moves the secondary vehicle directly adjacent to the mine by remote control, and triggers the fuze for the explosive charge by an appropriate firing signal.

In a similar manner to direct control of a destructible mine hunting drone via a connecting cable from a platform, this connecting cable is at the same time also destroyed with the loss of the secondary vehicle in the known use of a primary vehicle and secondary vehicle. After a mine clearance mission, the underwater vehicle and the connecting cable must therefore be replaced, with the corresponding financial cost.

DD 301 215 A7 discloses a method and an appliance system for destruction of mines by means of an unmanned underwater vehicle having an autonomous energy supply for transport of a mine destruction charge, in which case a control cable for controlling the underwater vehicle from onboard a vessel is used as the firing cable at the same time. The combined control and firing cable is galvanically or contactlessly, in particular inductively, coupled to a firing apparatus for the mine destruction charge. In order to place the mine destruction charge adjacent to the mine when a mine has been positively identified, and to move the underwater vehicle back to the carrier platform before the explosive charge is fired, the connecting cable is subdivided into two length elements, corresponding to the radius of action. The first length element is accommodated on a separate cable spool, and is thrown away with the mine destruction charge. The return process is carried out by means of cable control via the second length element, which is accommodated on a second cable spool in the underwater vehicle.

The first and the second length elements of the combined control and firing cable for the known device are connected by means of a connecting element (for example a plug). After the explosion has been triggered via the connecting cable, in the case of the known device, the first length element of the combined control and firing cable is lost with the discarded mine destruction charge. However, when an explosion takes place, the second length element of the connecting cable is also connected to the mine destruction charge and is destroyed or is at least damaged to such an extent that it must be replaced for cost reasons.

DD 300 526 A5 discloses an underwater appliance carrier which can be remotely controlled by cable, in particular a mine hunting appliance which tows a control cable which is unwound from a cable spool arranged on the underwater appliance carrier, and is placed on the seabed. The known device is based on the idea that, during positioning of the underwater appliance carrier and during turning maneuvers, the lack of a cable pulling-off force results in the risk of damage to the control cable, which emerges directly out of the hull of the underwater appliance carrier from projecting hull parts, for example rudders and side fins, but in particular from the propulsion propellers, being extraordinarily high. In order to reduce the risk of damage to the control cable and to keep the exposed part of the control cable outside the danger area of the projecting hull parts and propellers, in the case of the known device, the control cable is guided within a flexible protective tube, which is arranged at the control cable outlet opening of the underwater appliance carrier and has appropriate bending stiffness.

The present invention is based on the problem of providing a device for connection of an optical waveguide cable to an unmanned underwater vehicle, and providing an unmanned underwater vehicle, which reduce the costs of a mission of the underwater vehicle.

SUMMARY OF THE INVENTION

The above object generally is achieved, according to the invention, by a device for connection of an optical waveguide cable to an underwater unmanned vehicle and by an unmanned underwater vehicle having a novel connection device for an optical waveguide cable.

According to the invention, the optical waveguide cable is connected to the underwater vehicle via a connecting device which has a connecting cable and connecting elements at the respective ends of the connecting cable, with a connecting element at one end for the optical waveguide cable and with a connecting element at the other end for the underwater vehicle. This avoids the generally very long optical waveguide cable for controlling the underwater vehicle being destroyed when the underwater vehicle is lost by explosions. Only the connecting device is lost, but this can be prefabricated at low cost as a disposable component.

The connecting cable is expediently a second optical waveguide cable. Since its loss is accepted, it advantageously has a short length, although this is adequate in order to reliably prevent damage to the optical waveguide swimming cable connected to the carrier platform, when an explosion takes place. In this case, the carrier platform for the underwater vehicle may be stationary or mobile, for example being setup onboard a marine vessel.

The optical waveguide cable, which is very long in comparison to the connecting cable, of the carrier platform can be used for further missions and is then equipped with a new connecting device, thus reducing the costs of a mission, in particular for mine clearance with the abovementioned second variant of a mine hunting drone.

A relatively large number of the disposable component can be stored on the carrier platform. In addition, the number of possible missions for the carrier platform can be increased, since the long optical waveguide cable can be reused, and a multiplicity of connecting cables can be stored, instead of one replacement for the long optical waveguide cable.

The connecting device can also be handled easily, since it requires only a few actions for connection at one end to the long optical waveguide cable of the carrier platform, and at the other end to the underwater vehicle.

The simple handling of the connecting device also reduces the potential for errors in preparation for a mission.

The optical waveguide cable, which is adapted to the connecting device, is advantageously a swimming cable. A swimming cable prevents the connecting line of the underwater vehicle becoming stuck on obstructions on the seabed. These advantageous characteristics also allow the connecting cable to be in the form of a swimming cable.

In one special embodiment, the ends of the connecting cable are each fitted with a connecting plug, with the connecting elements of the connecting cable having strain relief elements for the cable ends, such that, on the one hand, there is a stable and robust optical waveguide connection between the carrier platform and the underwater vehicle, thus reducing the probability of failure. On the other hand, the strain relief elements at the ends ensure reliable recovery of the cable and of the underwater vehicle. When resettable fuzes are used, for example EFI fuzes (electrical fuze igniters), the connection with strain relief makes it possible to simplify the recovery of the underwater vehicle. During a mine clearance mission which is associated with loss of the mine hunting drone, the underwater vehicle can quickly be found in the event of a fault, for example in the event of a failure to fire, with the aid of the connection provided by the optical waveguide cable and the connecting cable, and can be moved away.

The low-cost connecting device furthermore has the advantage of being completely compatible with already existing optical waveguide cable systems.

The defining characteristics of the connecting device make it possible to make a reliable operational recommendation corresponding to the environmental conditions. In this case, it has been found that there is a linear relationship for the situation-related parameters that have to be taken into account with respect to the distance to the target and the opposing current for the underwater vehicle. If the operational range for the swimming cable and connecting cable, which is limited linearly by the target distance and the opposing current, is exceeded, then a mission can be recommended using two spools for deploying the optical waveguide cable. In this variant, a spool for deploying the connecting cable is provided both on the carrier platform and on the underwater vehicle, in order to provide a connection with strain relief, which is therefore stable. Owing to the linear relationship between the situation-related parameters, specifically the distance to the target and the opposing current, suitability of the control according to the invention of the underwater vehicle by means of optical waveguide cable and connecting device can be assumed to be reliable, below a target distance of several hundred meters and an opposing current of a few knots.

The connecting element for the optical waveguide cable advantageously comprises a swimming body which holds one section of the connecting cable by means of a strain relief element, and has a further strain relief element for holding the optical waveguide cable. The plug connection between the optical waveguide cable and the connecting cable is therefore protected against tensile forces, and therefore against undesirable disconnection, since tensile forces are passed between the two connected cables via the fixed swimming body.

The connecting element of the connecting cable for the underwater vehicle is advantageously formed with a body, which is extended radially with respect to the cable, for arrangement on a stern chamber of the underwater vehicle, which is fitted with the strain relief element for that end of the connecting cable which can be connected to the underwater vehicle. This body has a cable guide for the connecting cable, through which the cable end is passed for connection to the underwater vehicle.

The cable guide is advantageously formed by a cable channel in the connecting element being in the form of a funnel. In this case, the wall of the funnel is rounded in order to effectively protect the optical waveguide cable against damage by bending and additionally to keep the possible bending of the optical waveguide within a range in which optical reflection takes place in the optical waveguide cable. This design of the connecting element allows the underwater vehicle to be adapted to provide strain relief, with little risk of disturbances, in a few actions.

The connecting device is advantageously designed such that it can be disconnected from the underwater vehicle, as a result of which the connecting device according to the invention is suitable for missions with reusable vehicles. For example, snagging of the cable on an underwater obstruction, such as a wreck, can make it impossible to recover the vehicle, thus allowing the underwater vehicle to be rescued by appropriately controlled disconnection of the cable connection.

This disconnection can be carried out, for example, by means of a miniature explosive device for blowing off the connecting cable or a remotely controllable cutting device for cutting through the connecting cable. Such disconnecting devices can be provided at one or both ends of the connecting cable, or else in between.

In addition, controlled separation of the connecting device from the underwater vehicle allows the underwater vehicle to carry out a partially cable-guided and partially autonomous mission. For example, cable guidance can be used down to a specific depth, and operations can then be carried out at even greater depths by cable disconnection. The controlled separation of the connecting device from the underwater vehicle makes it possible, for example, to work on pipelines, which work must normally be carried out autonomously.

In one special embodiment, the cable is disconnected at the swimming body of the connecting device, thus allowing the swimming cable to be retrieved. The swimming cable and the connecting device can be disconnected in a controlled manner, if the connecting cable and its connecting elements have less tensile strength than the swimming cable. Separation of the connecting apparatus can then be brought about by deliberately building up tensile forces, for example by operating the winch for the swimming cable. The strain relief elements on the connecting elements of the connecting cable can also be arranged or set for this purpose such that different tensile strengths allow deliberate separation of the cable.

The costs for production of the connecting device according to the invention are further reduced if all the connecting elements have physically identical strain relief elements. In this case, the strain relief elements are matched to the cross sections of the respectively connected cables. It is advantageous to match the cross section of the connecting cable to the cross section of the swimming cable, thus allowing cables with the same cross sections and physically identical strain relief elements to be used.

In order to prevent damage to the connecting cable caused by the propulsion system of the underwater vehicle or to prevent the connecting cable becoming wound up around the drive, a flexible tube is arranged at the connecting element for the underwater vehicle, through which flexible tube the connecting cable is passed. In the installed position, the flexible tube accordingly points away from the underwater vehicle and prevents excessive bending of the connecting cable in the area of the vehicle drive. The flexible tube is advantageously arranged adjacent to the body which has the cable guide.

Particularly advantageously, the connecting cable is wound onto a winding support which can be fitted to an adapter provided on the carrier platform. The disposable component can thus be mounted in an organized form, and can be used quickly when required. Furthermore, the cable winding ensures that the connecting cable is emitted safely during the launch phase of the underwater vehicle.

The disposable component of the cable winding can also be handled easily and quickly. During the preparation for the mission, the user just has to connect the swimming body to the optical waveguide cable, and connect the connecting cable to the underwater vehicle, as well as fitting the cable winding of the connecting cable to the adapter which, for example, can be attached to the bulwark of a watercraft. Once the underwater vehicle has been deployed and launched, a length of a few dozen meters of the connecting cable is first of all unwound. Once the connecting cable is in the water, the swimming body starts to pull the swimming cable off the cable winch, by acting as a connection which transmits force between the connecting cable and the swimming cable.

Further advantageous embodiments will become evident from the dependent claims and the exemplary embodiments of the invention, which are explained in more detail with reference to the drawing.

DETAILED DESCRIPTION OF THE INVENTION

Figure 1:
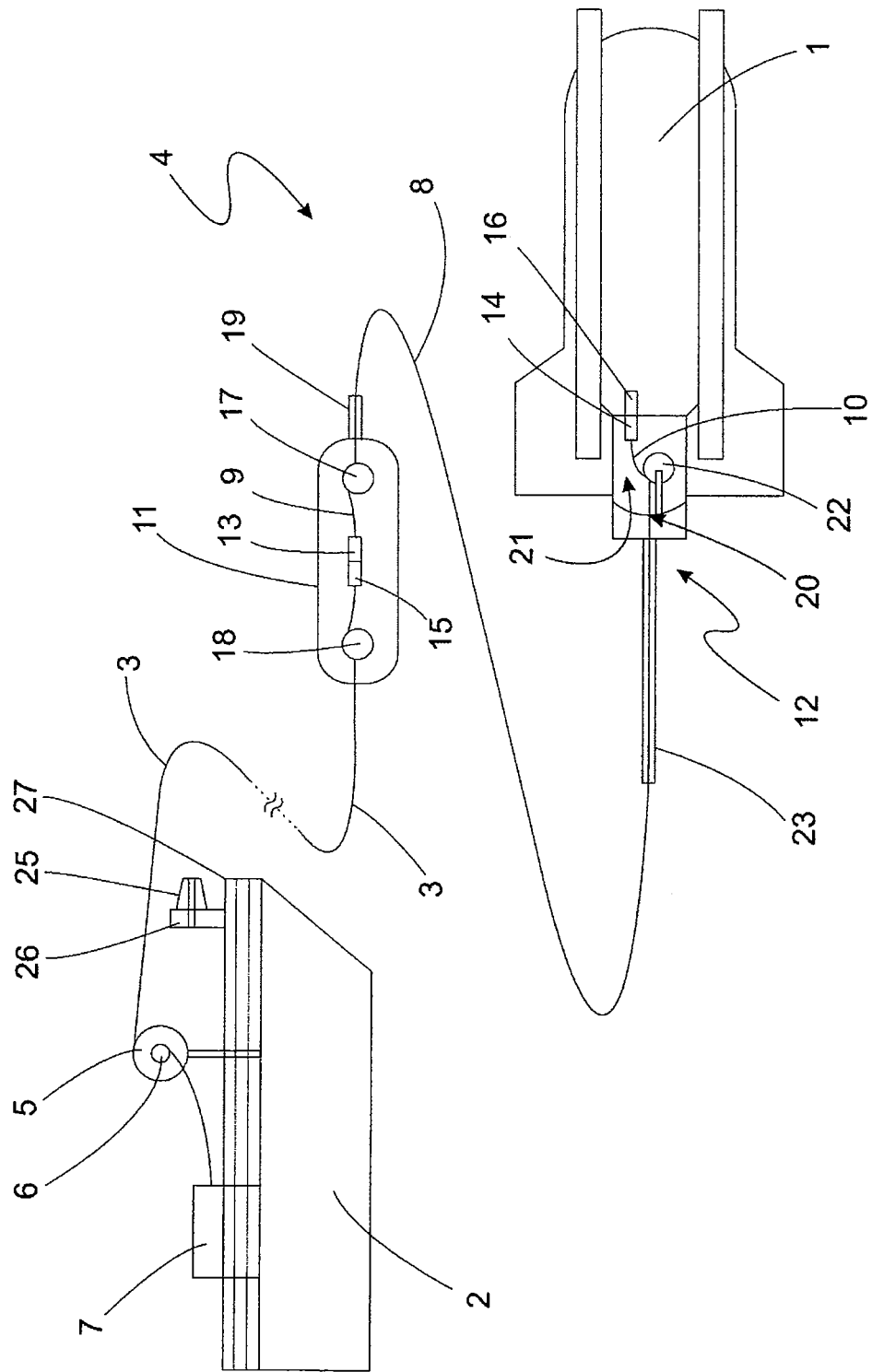
FIG. 1 shows a schematic illustration of a watercraft and of an unmanned underwater vehicle, which are connected to one another by an optical waveguide cable and a connecting device according to the invention.

FIG. 1 schematically illustrates an unmanned underwater vehicle 1 which is controlled from a carrier platform 2 via a cable connection. The carrier platform 2 in the exemplary embodiment is a surface vessel. Alternatively, the carrier platform is an underwater vehicle, for example a submarine, a swimming platform, for example a vehicle without propulsion, such as a tender, a transportable container or any form of mobile or stationary platform which, for example, is located on land in a coastal area, or is fixed to the seabed, for example in order to make it possible to rid waterways, in particular seaways, affected by mining, of mines. The underwater vehicle 1 is a mine hunting drone which can be equipped with an explosive charge for mine clearance missions, or with various sensors for mine detection.

Figure 2:
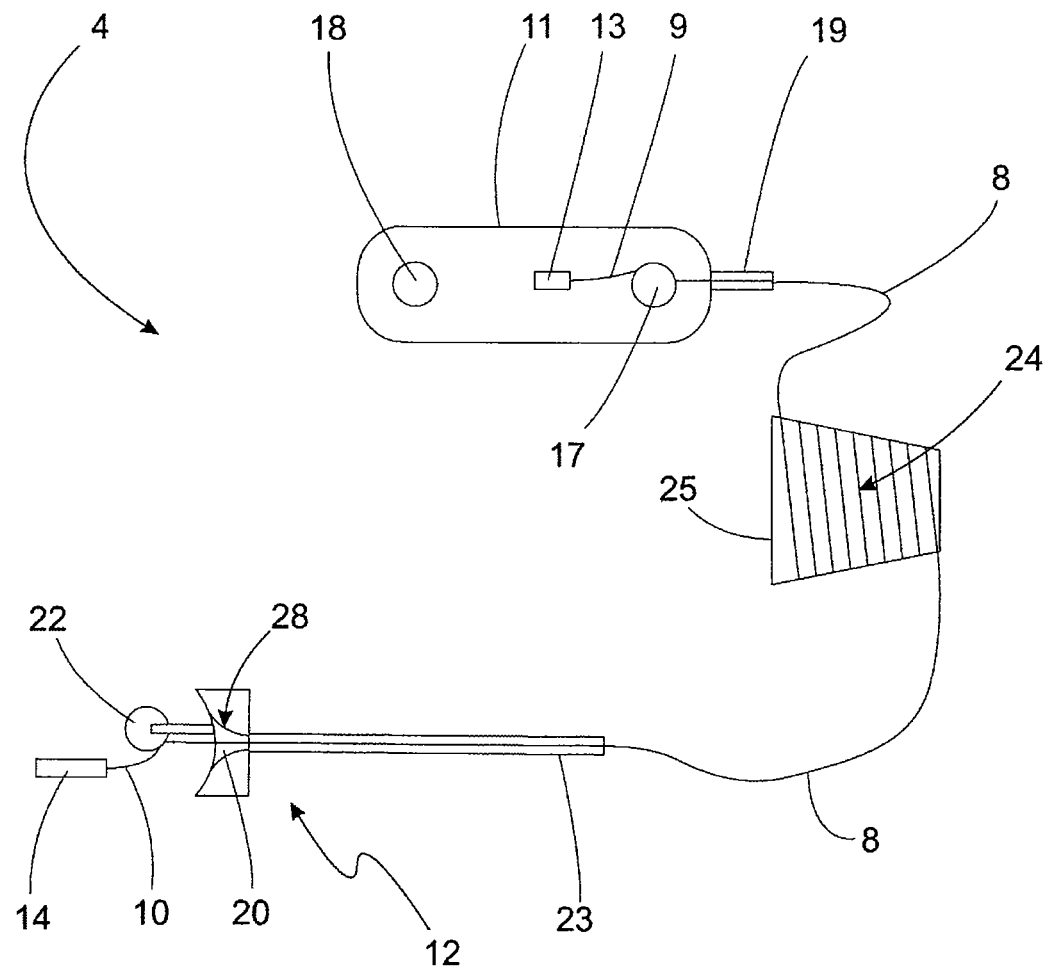
FIG. 2 shows a schematic illustration of a device for connection of an optical waveguide cable to an unmanned underwater vehicle.

The cable connection for controlling the underwater vehicle 1 consists of an optical waveguide swimming cable 3, which is connected to the underwater vehicle 1 by means of a connecting device 4, which is illustrated separately in FIG. 2. The optical waveguide swimming cable 3 is fed from a cable winch 5 onboard the watercraft 2. Strain relief 6, which is associated with the cable winch 5 in the exemplary embodiment, ensures that the swimming cable 3 is connected to a control unit 7 of the carrier platform 2 with strain relief.

The connecting device 4 consists of an optical waveguide cable as a connecting cable 8, at whose ends 9, 10 connecting elements are arranged, specifically a swimming body 11 at the end 9 and a connecting element 12 for connection to the underwater vehicle 1, at the other end 10.

A plug 13, 14 is arranged at each of the two respective ends 9, 10 of the connecting cable. Before the underwater vehicle 1 is deployed, the plug 13 associated with the swimming body 11 is connected to a corresponding plug element 15 on the swimming cable 3. The plug 14 at the other end 10 of the connecting cable 8 is connected to a corresponding contact 16 in the underwater vehicle 1.

The swimming body 11 is a solid body which holds the end 9 of the connecting cable 8 with a strain relief element 17. The swimming body 11 has a further strain relief element 18 for holding the swimming cable 3. Both strain relief elements 17, 18 are attached to the swimming body 11, such that tensile forces are transmitted between the connected cables 3, 8 through the solid swimming body 11. The swimming body 11 is in the form of an elongated body, to each of whose ends the strain relief mechanisms 17, 18 are attached, such that the cable ends can easily be plugged together in the space between the strain relief elements 17, 18, producing a plug connection with strain relief. This prevents the mine hunting drone 1 from disconnecting the plug connection at the swimming body as said drone continues to move, or else undesirable disconnection of the connecting cable occurring when the swimming cable 3 is being retrieved.

The plug connection between the connecting cable 8 and the swimming cable 3 as well as the associated strain relief elements 17, 18 are accommodated in the interior of the swimming body 11. The swimming body 11 is streamlined and, in the present exemplary embodiment, has in its interior a foam which is resistant to the pressure at the operational depth of the underwater vehicle and acts as a buoyant body. The end 9 of the connecting cable 8 is passed via a kink protection means 19 formed on the swimming body 11, into the interior of the swimming body 11, thus preventing the connecting cable 8 from being bent.

The connecting element 12 for the underwater vehicle 1 is designed with a body, which is formed radially in places, for arrangement on a stern chamber 21 of the underwater vehicle 1, with the body having a cable guide 20 for the connecting cable 8. The end 10 of the connecting cable 8 is passed into the stern chamber 21 in a defined manner through the cable guide 20. The cable guide 20 prevents damage to the optical waveguide by being bent sharply. Furthermore, the cable guide is shaped at one or both of its ends such that the minimum bending radii to be complied with for the optical waveguide are actually complied with. For this purpose, the (respective) end preferably has a convex-curved section in the form of a funnel.

In the area of the cable guide 20, the connecting element 12 is fitted with a strain relief element 22, which relieves strain on the end 10 of the connecting cable 8 and protects it against undesirable separation during a mission. A flexible tube 23, through which the connecting cable 8 runs, is arranged on that side of the body which is opposite the strain relief element 22 and is equipped with the cable guide 20. The flexible tube 23, is preferably composed of silicone, protects the connecting cable 8 against excessive bending in the area of the connecting element 12, and, in particular, keeps the connecting cable 8 away from the propulsion system located in the stern area of the underwater vehicle 1.

In one exemplary embodiment, which is not illustrated, instead of having a flexible tube, the connecting cable 8 can be equipped with a protective casing which extends over the entire length of the connecting cable.

The connecting device 4, which is illustrated separately in FIG. 2, is a disposable component which can be produced at low cost and consists of the connecting cable 8 as well as the swimming body 11 and the connecting element 12 for the mine hunting drone. The component includes a cable winding 24 with a winding support 25 on which the connecting cable 8 is wound. The winding support 25 in the exemplary embodiment is a conical spool, from which the connecting cable 8 can easily be drawn off at the start of a mission. While the mine hunting drone is being prepared for a mission, the winding support 25 is plugged onto the adapter 26 on the carrier platform 2 (FIG. 1), in one simple process step. In the present exemplary embodiment, the adapter 26 is attached to the bulwark 27 of the surface vessel, but can also be arranged elsewhere on the vessel.

As a disposable component, the connecting device 4 is likewise lost during a mine hunting mission, as a result of the destruction of the underwater vehicle, although damage to the long optical waveguide cable of the carrier platform caused by the detonation is avoided. The long swimming cable is located at a safe distance from the underwater vehicle, corresponding to the length of the connecting cable 8, and can therefore be reused. The connecting cable 8 is sufficiently long to protect the swimming cable against damage when an explosion occurs.

The low-cost production and capability to handle the connecting device 4 easily are also promoted by all the strain relief elements 17, 18, 22 on the swimming body 11 and the connecting device 4 being physically identical to the connecting element 12.

The connecting device 4 can be handled easily during mission preparation, thus reducing error sources. The user just has to fit the swimming cable 3 in the swimming body 11 and the strain relief element 18 which is provided in the swimming body 11, and then adapt the underwater vehicle via the flexible tube 23 and the body of the connecting element 12, with this body being equipped with the cable guide 20. Once the underwater vehicle has been deployed and launched, it first of all draws the length of the connecting cable 8 off the cable winding 24 and then, via the swimming body 11, draws the actual swimming cable 3 into the water. The underwater vehicle then draws the optical waveguide swimming cable 3 off the cable winch 5 on the carrier platform 2. During the process, the strain relief elements 17, 18 in the swimming body 11 ensure that tensile forces are transmitted between the connecting cable 8 and the swimming cable 3 without adversely affecting the glass-fiber plug connection.

An optical waveguide channel 28 is provided in the connecting element 12, whose end section facing the cable end 10 is part of the cable guide 20. The end section of the optical waveguide channel 28 is in the form of a funnel with a convex-rounded contour, with the bending radii preventing undesirable bending of the optical waveguide cable and therefore damage to the connecting cable 8. The radial body of the connecting element 12 and the cable guide 20, which is formed in the body, thus together form an approximately s-shaped contour.

All of the features mentioned in the description of the figures, in the claims and in the introductory part of the description can be used both individually and combined with one another in any desired manner. The invention is therefore not restricted to the described and claimed feature combinations. In fact, all feature combinations should be considered as having been disclosed.

What is claimed is:

1. Connecting device for connection of an optical waveguide cable (3) to an unmanned underwater vehicle (1), characterized by a connecting cable (8) and connection elements (11, 12) at the respective ends (9, 10) of the connecting cable (8) for an optical waveguide cable (3) at one end and for an unmanned underwater vehicle (1) at the other end, wherein the connecting element (11) connecting the optical waveguide cable (3) to the connecting cable (8) is a buoyant body (11).

2. Connecting device according to claim 1, characterized in that the ends (9, 10) of the connecting cable (8) are each fitted with a connecting plug (13, 14), and the connecting elements (11, 12) have strain relief elements (17, 22) for the ends (9, 10) of the connecting cable (8).

3. Connecting device according to claim 1, characterized in that the buoyant body (11) holds one end (9) of the connecting cable (8) by a strain relief element (17), and has a further strain relief element (18) for holding the optical waveguide cable (3).

4. Connecting device according to claim 2, characterized in that the connecting element (12) for the underwater vehicle (1) has a body, which has a cable guide (20), for arrangement of the connecting element (12) on a stern chamber (21) of the underwater vehicle (1), which is fitted with the strain relief element (22) for that end (10) of the connecting cable (8) which can be connected to the underwater vehicle (1).

5. Connecting device according to claim 4, characterized in that the connecting cable (8) is passed through a flexible tube (23), which is arranged at the connecting element (12) for the underwater vehicle (1).

6. Connecting device according to claim 3, characterized in that the connecting elements (11, 12) have physically identical strain relief elements (17, 18, 22).

7. Connecting device according to claim 1, characterized in that the connecting cable (8) is wound on a winding support (25).

8. Unmanned underwater vehicle which can be controlled by means of an optical waveguide cable (3) that can be fed from a carrier platform (2), characterized in that the optical waveguide cable (3) is connected to the underwater vehicle (1) via a connecting device (4) which has a connecting cable (8) and a respective connecting element (11, 12) at one end for the first optical waveguide cable (3) and for the underwater vehicle (1), wherein the connecting element (11) connecting the optical waveguide cable (3) to the connecting cable (8) is a buoyant body (11).

9. Underwater vehicle according to claim 8, characterized in that the connecting device (4) is designed such that it can be disconnected from the underwater vehicle (1).

10. Underwater vehicle according to claim 8, characterized in that the connecting cable (8) is wound on a winding support (25) which can be fitted to an adapter (26) which is associated with the carrier platform (2).

11. A connecting device having a swimming optical waveguide cable and a connection cable that is adapted to be connected to an unmanned underwater vehicle, wherein said device comprises a connecting cable having respective ends, connection elements at the respective ends of the connecting cable, one said connection element comprises a buoyant body for connecting an end of the swimming optical waveguide cable to one of the respective ends of the connecting cable, and the other said connection element is for connecting the other respective end of the connection cable to an unmanned underwater vehicle.

* * * * *